US008281183B2

(12) United States Patent
Mantor et al.

(10) Patent No.: US 8,281,183 B2
(45) Date of Patent: *Oct. 2, 2012

(54) APPARATUS WITH REDUNDANT CIRCUITRY AND METHOD THEREFOR

(75) Inventors: Michael Mantor, Orlando, FL (US); Ralph Clayton Taylor, Deland, FL (US); Robert Scott Hartog, Windermere, FL (US)

(73) Assignee: ATI Technologies Inc., Markham, Ontario (CA)

(*) Notice: Subject to any disclaimer, the term of this patent is extended or adjusted under 35 U.S.C. 154(b) by 172 days.

This patent is subject to a terminal disclaimer.

(21) Appl. No.: 12/509,803

(22) Filed: Jul. 27, 2009

(65) Prior Publication Data

US 2010/0017652 A1    Jan. 21, 2010

Related U.S. Application Data

(63) Continuation of application No. 11/161,672, filed on Aug. 11, 2005, now Pat. No. 7,577,869.

(60) Provisional application No. 60/600,942, filed on Aug. 11, 2004.

(51) Int. Cl.
G06F 11/00 (2006.01)

(52) U.S. Cl. ........................................................ 714/11
(58) Field of Classification Search .................... 714/11, 714/2
See application file for complete search history.

(56) References Cited

U.S. PATENT DOCUMENTS

| | | | |
|---|---|---|---|
| 4,435,782 A | 3/1984 | Kaufman et al. | |
| 4,546,428 A | 10/1985 | Morton | |
| 5,253,308 A | 10/1993 | Johnson | |
| 5,517,666 A | 5/1996 | Ohtani et al. | |
| 5,748,872 A | 5/1998 | Norman | |
| 5,867,723 A | 2/1999 | Chin et al. | |
| 6,021,511 A | 2/2000 | Nakano | |
| 6,044,448 A | 3/2000 | Agrawal et al. | |
| 6,073,185 A | 6/2000 | Meeker | |
| 6,205,515 B1 | 3/2001 | Huang | |
| 6,308,252 B1 | 10/2001 | Agarwal et al. | |
| 6,505,306 B1* | 1/2003 | Blackmon et al. | 714/6.1 |
| 6,785,841 B2 | 8/2004 | Akrout et al. | |
| 6,792,560 B2 | 9/2004 | Francis et al. | |
| 6,956,576 B1 | 10/2005 | Deering et al. | |
| 7,124,318 B2 | 10/2006 | Luick | |
| 2001/0008563 A1 | 7/2001 | Yamaura et al. | |
| 2002/0019841 A1 | 2/2002 | Kiuchi et al. | |
| 2002/0157066 A1 | 10/2002 | Marshall et al. | |
| 2002/0174318 A1 | 11/2002 | Stuttard et al. | |

(Continued)

Primary Examiner — Scott Baderman
Assistant Examiner — Yair Leibovich
(74) Attorney, Agent, or Firm — Faegre Baker Daniels LLP

(57) ABSTRACT

An apparatus with circuit redundancy includes a set of parallel arithmetic logic units (ALUs), a redundant parallel ALU, input data shifting logic that is coupled to the set of parallel ALUs and that is operatively coupled to the redundant parallel ALU. The input data shifting logic shifts input data for a defective ALU, in a first direction, to a neighboring ALU in the set. When the neighboring ALU is the last or end ALU in the set, the shifting logic continues to shift the input data for the end ALU that is not defective, to the redundant parallel ALU. The redundant parallel ALU then operates for the defective ALU. Output data shifting logic is coupled to an output of the parallel redundant ALU and all other ALU outputs to shift the output data in a second and opposite direction than the input shifting logic, to realign output of data for continued processing, including for storage or for further processing by other circuitry.

7 Claims, 11 Drawing Sheets

U.S. PATENT DOCUMENTS

| | | |
|---|---|---|
| 2003/0164840 A1 | 9/2003 | O'Driscoll |
| 2003/0179631 A1 | 9/2003 | Koob et al. |
| 2003/0204805 A1 | 10/2003 | Prabhu |
| 2005/0275657 A1 | 12/2005 | Hutchins et al. |
| 2006/0053188 A1 | 3/2006 | Mantor et al. |
| 2006/0053189 A1 | 3/2006 | Mantor |

* cited by examiner

ALU (VECTOR SCALAR PROCESSOR)

| ROM:ROM_BAD_PIPE_FUSE_REG · [RW] · 32 BITS · ACCESS: 8/16/32 · ROMDEC:0X1A0 | | | |
|---|---|---|---|
| DESCRIPTION: STATE OF LASER FUSE DISABLE BITS | | | |
| DESCRIPTION | BITS | DEFAULT | |
| EN_RSP_FUSE (ACCESS: R) | 31 | NONE | ENABLE REDUNDANT SP UNIT USAGE |
| EN_RSP_ALL_SIMD_FUSE (ACCESS: R) | 30 | NONE | ENABLE REDUNDANT SP UNIT USAGE FOR ALL SIMD'S WHEN ENABLED – SET FOR DESIGNS THAT HAVE A REDUNDANT SP (INCLUDES MULTIPLE SIMD VECTOR PIPES) |
| RSP_SIMD_SEL_FUSE (ACCESS: R) | 29:28 | NONE | CONTROL BIT, REDUNDANT SIMD SELECTION |
| RSP_PIPE_SEL_FUSE (ACCESS: R) | 27:24 | NONE | CONTROL BIT, REDUNDANT PIPE SELECTION |
| LASER_FUSES (ACCESS: R) | 20:0 | NONE | SIMD3 SP7-6, SP5-4, SP3-2, SP1-0, SIMD2 SP7-6, SP5-4, SP3-2, SP1-0, SIMD1 SP7-6, SP5-4, SP3-2, SP1-0 CONTROL BIT, SP7-6, SP5-4, SP3-2, SP1-0, MC3, MC2, MC1, MC0 |

| ROM:ROM_BAD_PIPE_DISABLE_REGISTER · [RW] · 32 BITS · ACCESS: 8/16/32 · ROMDEC:0X194 | | | |
|---|---|---|---|
| DESCRIPTION: DISABLE MEMORY CHANNELS | | | |
| FIELD NAME | BITS | DEFAULT | DESCRIPTION |
| EN_RSP | 31 | NONE | ENABLE REDUNDANT SP UNIT USAGE |
| EN_RSP_ALL_SIMD | 30 | NONE | ENABLE REDUNDANT SP UNIT USAGE FOR ALL SIMD'S WHEN ENABLED – SET FOR DESIGNS THAT HAVE A REDUNDANT SP (INCLUDES MULTIPLE SIMD VECTOR PIPES) |
| RSP_SIMD_SEL | 29:28 | NONE | CONTROL BIT, REDUNDANT SIMD SELECTION |
| RSP_PIPE_SEL | 27:24 | NONE | CONTROL BIT, REDUNDANT PIPE SELECTION |
| SPARE | 23:4 | NONE | |
| DISABLE_MC | 3:0 | NONE | DISABLE {MC3, MC2, MC1, MC0} |

FIG. 11

APPARATUS WITH REDUNDANT CIRCUITRY AND METHOD THEREFOR

RELATED APPLICATIONS

This application is a continuation of U.S. application Ser. No. 11/161,672 (now U.S. Pat. No. 7,577,869), filed Aug. 11, 2005, entitled "APPARATUS WITH REDUNDANT CIRCUITRY AND METHOD THEREFOR", having as inventors Michael Mantor et al., owned by instant assignee and is incorporated herein by reference, which claims the benefit of U.S. Provisional Application Ser. No. 60/600,942 filed Aug. 11, 2004, entitled "APPARATUS WITH REDUNDANT CIRCUITRY AND METHOD THEREFOR", having as an inventors Michael Mantor et al., which is related to U.S. application Ser. No. 11/161,674 filed Aug. 11, 2005, entitled "GRAPHICS PROCESSING LOGIC WITH VARIABLE ARITHMETIC LOGIC UNIT CONTROL AND METHOD THEREFOR", having as inventor Michael J. Mantor, which claims the benefit of U.S. Provisional Application Ser. No. 60/600,943 filed Aug. 11, 2004, entitled "GRAPHICS PROCESSING LOGIC WITH VARIABLE ARITHMETIC LOGIC UNIT CONTROL AND METHOD THEREFOR", having as inventor Michael J. Mantor, and owned by instant assignee and hereby incorporated by reference in its entirety.

FIELD OF THE INVENTION

The invention relates generally to apparatus that employ redundant circuitry, and more particularly to apparatus that employ redundant circuitry that perform arithmetic operations and methods therefor and/or apparatus that employ multiple parallel arithmetic logic units.

BACKGROUND OF THE INVENTION

Hardware redundancy may be employed in various circuits by including extra copies of a hardware block or circuit that can replace original versions of a same circuit if original versions are found to be defective in silicon. Production yields can be then be increased by including extra circuitry to be switched in for defective circuitry.

However, with large parallel floating point resources that are used in graphics processors, or other processing devices, or any other suitable Arithmetic Logic Units, effectively employing redundancy can be quite difficult since the silicon area may be quite large and the inner connections quite complex.

One solution would be to route all inputs that are routed to an original circuit to a redundant circuit and then select which input corresponds to the defective circuit. However, routing all inputs to a redundant circuit may require too much wiring that may increase system layout complexity and chip susceptibility to increased noise and thus potentially reduce yields and increase cost.

In graphics processors for example, vector processors may be built in parallel to facilitate carrying out of arithmetic operations with respect to vertex information for example, for use in vertex shading operations, or for any other suitable operations. Such vector processors are a type of ALU (arithmetic logic unit) that can be critical to the operation and performance of a graphics processor. Accordingly, avoiding a high yield loss would be advantageous for devices that employ parallel processor ALUs.

BRIEF DESCRIPTION OF DRAWINGS

The invention will be more readily understood in view of the following description when accompanied by the below figures and wherein like reference numerals represent like elements:

FIG. 11 is a diagram illustrating in table form description of memory contents for controlling the connection of a redundant circuit in accordance with one embodiment of the invention.

DETAILED DESCRIPTION OF THE INVENTION

Figure 1:
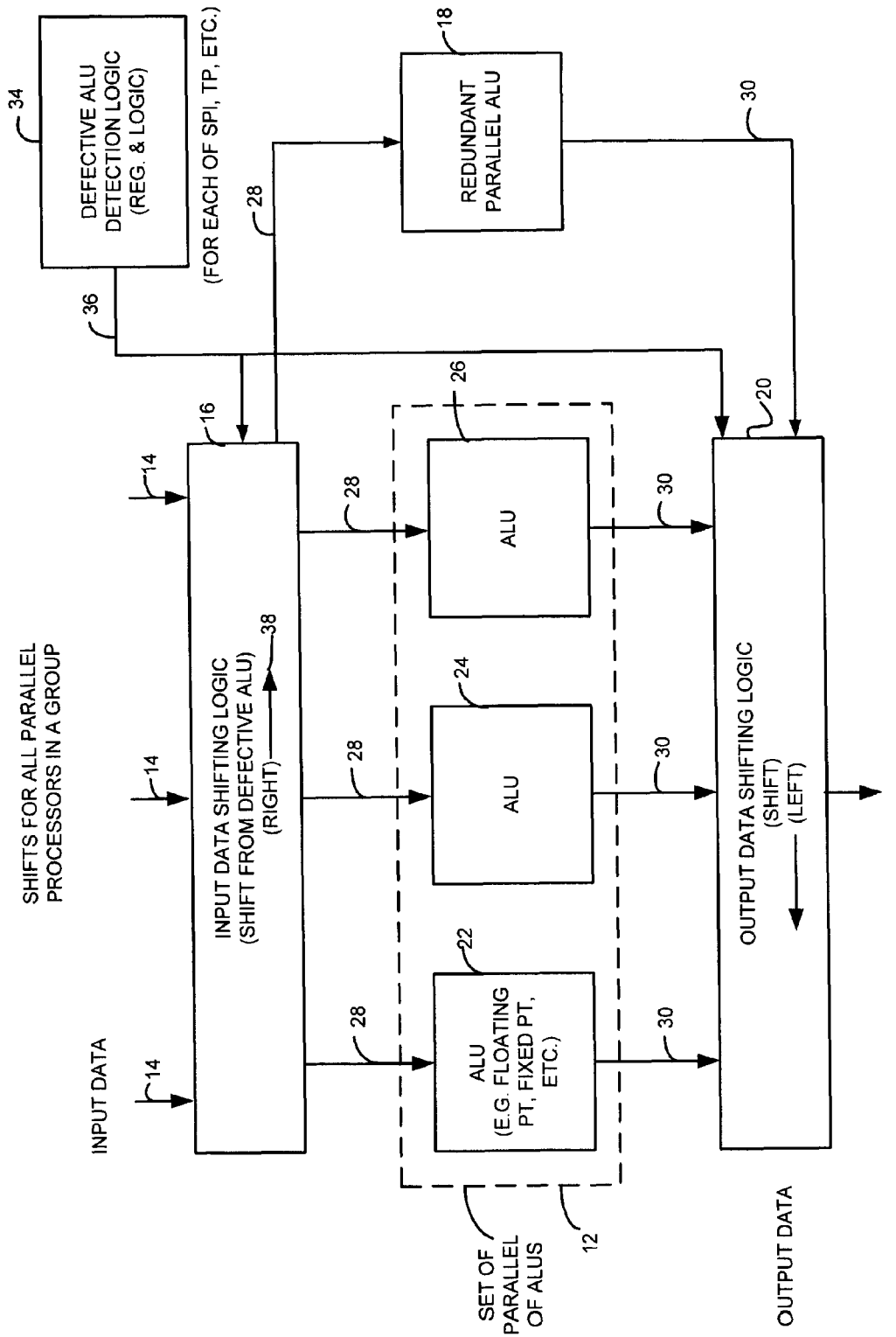
FIG. 1 is a block diagram illustrating one example of an apparatus with circuit redundancy in accordance with one embodiment of the invention.

Briefly, an apparatus with circuit redundancy includes a set of parallel arithmetic logic units (ALUs), a redundant parallel ALU, input data shifting logic that is coupled to the set of parallel ALUs and that is operatively coupled to the redundant parallel ALU. The input data shifting logic shifts input data for a defective ALU, in a first direction, to a neighboring ALU in the set. When the neighboring ALU is the last or end ALU in the set, the shifting logic continues to shift the input data for the end ALU that is not defective, to the redundant parallel ALU. The redundant parallel ALU then operates on a unit of work for the defective ALU, but not necessary the same data set as the defective unit unless it was the last of a set of ALUs. Output data shifting logic is coupled to an output of the parallel redundant ALU and all other ALU outputs to shift the output data in a second and opposite direction than the input shifting logic, to realign output of data for continued processing, including for storage or for further processing by other circuitry. As such, once a defective ALU is detected, data for that ALU is then shifted to a neighboring ALU and data for the neighboring ALU is routed to a next neighboring ALU and so on until an end ALU is reached where after the data destined for the end ALU is then passed to the redundant ALU for processing. The shifting logic may be dynamically controlled each time the defective ALU is to be used or more statically such as once after testing determines which ALU is defective.

A method is also disclosed that includes storing data representing which ALU is defective, such as one or more registers identifying column and row information regarding an ALU that is in a two dimensional array, or any other suitable identification data. The method also includes receiving input data for a group of parallel ALUs, shifting input data for the defective ALU in the first direction to a neighboring ALU and all subsequent ALUs in the group and from the end ALU in the group (e.g. subset) to a redundant ALU. The method also includes shifting output data from the redundant ALU and all other ALU outputs in a second direction to realign output to correct data path flow for the ALU array caused by the shifting of the input data.

In another embodiment, a set of parallel ALUs are divided into a plurality of subsets of parallel ALUs. Data shifting logic associated with each of the subset is employed and is operative to shift input data to a neighboring parallel ALU in a subset. Multiplexing logic is operatively coupled to the subset based data shifting logic and also coupled to the redundant parallel ALU, to receive data destined from an end ALU in each of the subsets of parallel ALUs. This may be advantageous where ALU circuitry for groups of ALUs are located in proximity to one another on an integrated circuit die to help reduce the wiring complexity and number of connections that need to be made to facilitate use of the redundant ALU if any of the parallel ALUs is defective. Also in this embodiment, output data shifting logic is also grouped in subsets and receives data output from the parallel redundant ALU and all other ALU outputs to shift the output data in a second and opposite direction to realign output of data for continued processing.

In another embodiment, a two dimensional array of arithmetic logic units are logically arranged to have multiple sets of horizontal parallel ALUs that receive or output data in a common cycle. In one example, the ALUs are made up of a plurality of single instruction multiple data (SIMD) processors that each include a set of parallel vector scalar processors. However, it will be recognized that any suitable ALUs may be employed. A single redundant ALU may be switched in for any of the ALUs in the two dimensional array of arithmetic logic units. Among other advantages, increased yields may be achieved with relatively low cost circuit redundancy since an entire SIMD processor need not be replicated as a redundant circuit but instead a subcomponent of the SIMD processor may be duplicated. In addition, the wiring complexity can be substantially reduced by grouping and shifting input/output data to multiple neighboring ALUs. In one embodiment, the shifting logic includes multiplexing logic that includes a bank of multiplexors. However any suitable switching structure may be employed.

FIG. 1 is a block diagram illustrating one example of an apparatus 10, such as a graphics processor, central processing unit, digital signal processor, or any other suitable logic unit. In this example, a set of parallel ALUs 12 receive their respective input data 14 through shifting logic 16. The input data 14 may come from any suitable source such as a previous processing stage, or any other suitable source. The apparatus 10 also includes a parallel redundant ALU 18 and output data shifting logic 20. The redundant parallel ALU 18 is connected in a parallel relationship with the ALUs in the set of parallel ALUs 12. Each of the parallel ALUs 22, 24 and 26 receive input data 28 through the input data shifting logic 16 via suitable connections, such as a bus or any other suitable communication channel(s). Each of the parallel ALUs 22, 24 and 26 generate output data 30 respectively to the output data shifting logic 20. The ALUs may be any suitable arithmetic logic units including, but not limited to, floating point ALUs, fixed point ALUs, any suitable combination thereof, vector processors, vector scalar processors, shaders or any other suitable circuitry for performing one or more arithmetic operations. One example of a shader may be found in co-pending application entitled GRAPHICS PROCESSING ARCHITECTURE EMPLOYING A UNIFIED SHADER, U.S. Pat. No. 6,897,871, issued May 24, 2005, incorporated herein by reference, although any suitable logic may be used.

The apparatus 10 also includes defective ALU detection logic 34 which may simply be memory such as registers or other memory element(s) that includes data that represents which of the parallel ALUs 22, 24 or 26 is defective and that serves as control data to control the shifting of data as described herein. In this example, the defective ALU detector logic 34 generates control data 36 to control input data shifting logic 16 and output shifting logic 20. The defective ALU detector logic 34 may also include test logic to test each of the ALUs individually to determine if any of the ALUs are defective.

The input data shifting logic 16 is controlled to shift input data 14 for a defective ALU in a first direction, such as in the direction shown by the arrow 38 for a defective ALU, to a next neighboring ALU in the set of parallel arithmetic logic units 12. For purposes of illustration only, it will be assumed that ALU 24 has been detected as being defective. Accordingly, the input data shifting logic 16 will be controlled by the defective ALU detector 34 to shift the input data 14 destined for ALU 24 to ALU 26. The input data 14 destined for ALU 26 then gets shifted to the redundant parallel ALU 18. The ALU 26 is considered an end non-defective ALU in the set, in this example. In this example, the shifting logic 16 would not shift data for ALU 22 since this ALU is not defective. As such, only ALUs to the right of the defective ALU will have their input data switched to another ALU or to the redundant parallel ALU 18. The redundant parallel ALU 18 is a copy of the ALUs 22, 24, and 26. Accordingly it will process the input data 28 that has been shifted accordingly and provide output data 30 to the output shifting logic. It will be recognized that in an alternative embodiment the shifting may be to the left.

As shown, the defective ALU detector control logic 34 also controls the output data shifting logic 20 which receives the output data from the redundant parallel ALU 18 and each of the parallel ALU units 22, 24, 26 and subsequently is controlled to shift the output data 30 in a second and opposite direction (in this case to the left) to realign output data for continued processing. The ALU detection control logic 34 may be any suitable logic that provides the memory control of the shifting logic. For example, since each of the ALUs may be passing data to another stage in a pipeline, the rest of the pipeline is not affected since the output data shifting logic 20 realigns the data flow caused by the input data shifting logic 16.

Figure 2:
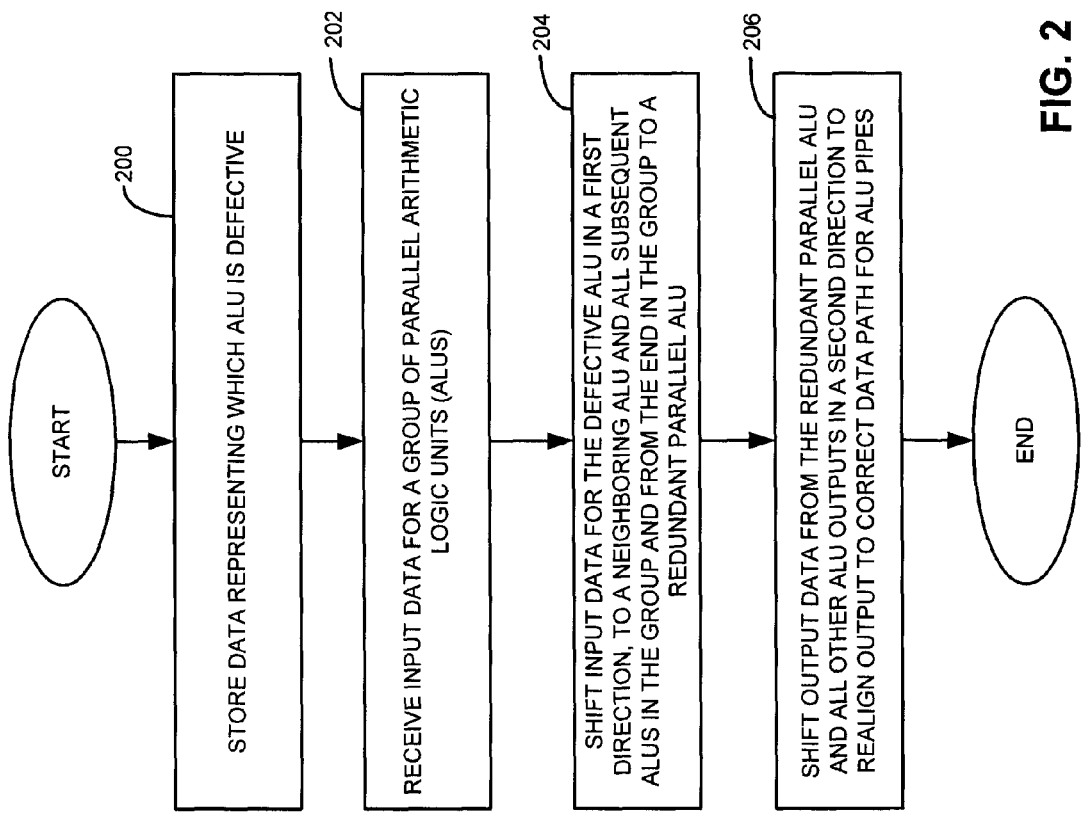
FIG. 2 is a flowchart illustrating one example of a method for providing circuit redundancy in accordance with one embodiment of the invention.

FIG. 2 illustrates one example of a method for providing circuit redundancy which as shown block 200 includes storing data representing which ALU is defective. For example, a test operator at a manufacturing facility may write to an on board register indicating which of the ALUs 22, 24, 26 failed to pass a particular test or may activate (blow) fuse bits to permanently control the shifting logic. Alternatively, the data may be automatically programmed by the apparatus 10 if a self test is performed. As shown in block 202, the method includes receiving input data 14 for a group or set of parallel arithmetic logic units, such as by the input data shifting logic 16. As shown in block 204, the method includes shifting the input data for the defective ALU in a first direction to a neighboring ALU and all subsequent neighboring ALUs in the same direction in the group. This may also include shifting the input from the end ALU, such as ALU 26 to the redundant parallel ALU 18. In this fashion, the defective ALU does not need to process input data and the redundant ALU may be switched in through a shifting approach to accommodate the defective ALU. The output from the redundant parallel ALU 18 is then shifted, as shown in block 206, from the redundant ALU and for all ALUs whose input data was shifted, in a second direction to realign output data to correct the data path for all affected neighboring circuits in an ALU pipeline if desired. This may be done for example by the output data shifting logic 20. It will be recognized that as described herein any operations, processors or steps may be carried out in any suitable order and that the order described above is just one example.

Storing data representing which ALU is defective may include for example storing a row and column ID if a two dimensional array of ALUs is employed as described later. As noted, the stored data may also be based on, for example, blown fuses that are blown during the testing process to indicate which ALU is defective. Any other suitable mechanism may also be used as desired. The defective ALU detection logic 34 may also include control logic that compares register values indicating which ALU is defective to command data or other ALU identification data that is part of the input data 14 to determine which ALU is being written to so that it may suitably generate the control data 36 to control switching and hence shifting of the data from a defective ALU to a neighboring ALU and to the redundant ALU as needed.

Figure 3:
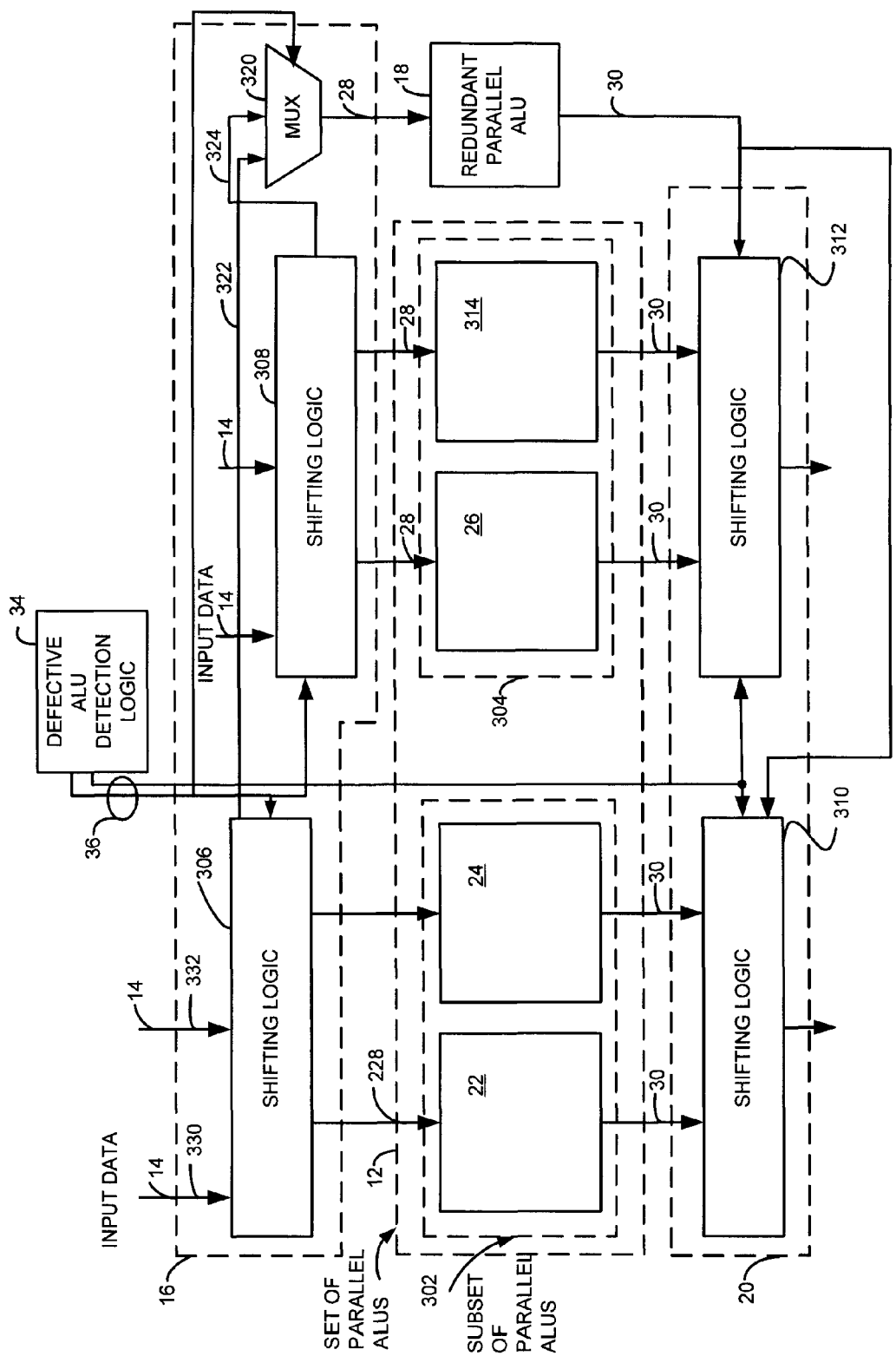
FIG. 3 is a block diagram illustrating one example of an apparatus with circuit redundancy in accordance with one embodiment of the invention.

FIG. 3 illustrates an alternative embodiment of an apparatus 300 with circuit redundancy which is the same type of apparatus shown in FIG. 1 or any other suitable apparatus. In this example the set of parallel ALUs 12 are divided into a plurality of subsets of parallel ALUs 302 and 304. Similarly, the input data shifting logic 16 is also divided into shifting logic 306 and 308 respectively corresponding to each of the subset of parallel ALUs. Also in a like manner, the output data shifting logic 20 is divided into shifting logic sections 310 and 312 wherein each of the shifting logic sections correspond to the subset of parallel ALUs 302 and 304 respectively. Subset of parallel ALUs 304 also includes an ALU 314 identical in structure to the other ALUs in this set of parallel ALUs 12.

Also in this example, the input data shifting logic 16 also includes multiplexing logic 320 that is operatively coupled to receive input data for an end ALU, such as end ALU 24 and end ALU 314 in each of the subset of parallel ALUs 302 and 304. This is shown as data 322 and 324. The multiplexing logic 320 is controlled by a control data 36 from the defective ALU detection logic 34 which selects which input data 14 for each corresponding ALU is actually sent to the redundant parallel ALU 18. The multiplexing logic 320 is coupled to the parallel redundant ALU 18 to provide selected input data from either of the shifting logic 306 or 308, and more particularly for input data destined for end ALU 24 or end ALU 314.

The shifting logic 310 and 312 is also controlled to suitably realign the output data 30 to the appropriate subsequent pipeline processes as determined by the defective ALU detection logic 34. This is done through control data 36. As such the shifting logic 310 and 312 shifts output data in an opposite direction to realign output of the data for continued processing or use.

By way of illustration, if ALU 22 is determined to be defective, the input data 14, in this example shown as input data 330, was originally destined for ALU 22, and is subsequently shifted to be received by ALU 24 by the shifting logic under control of the defective ALU detection logic 34. The input data 332 normally destined for ALU 24 is then passed to multiplexor 320 as data 322 and the defective ALU detection logic 34 controls the multiplexing logic 320 to select data 322 to be processed by the parallel redundant ALU 18. Since the shifting logic 306 and 310 has been divided for the set of parallel ALUs 12, the shifting logic 308 and processing of by ALUs 26 and 314 are not affected. The defective ALU detection logic 34 controls the shifting logic 306 and the multiplexing logic 320 to pass input data 332 to the parallel redundant ALU 18. The multiplexing logic 320 is shown as being operatively coupled to inputs of the plurality of parallel ALUs (such as end ALUs) through the shifting logic 306 and 308 and to the parallel redundant ALU 18. The multiplexing logic 320 is controllable to output the input data 28 destined for one of the ALUs to the redundant parallel ALU.

Figure 4:
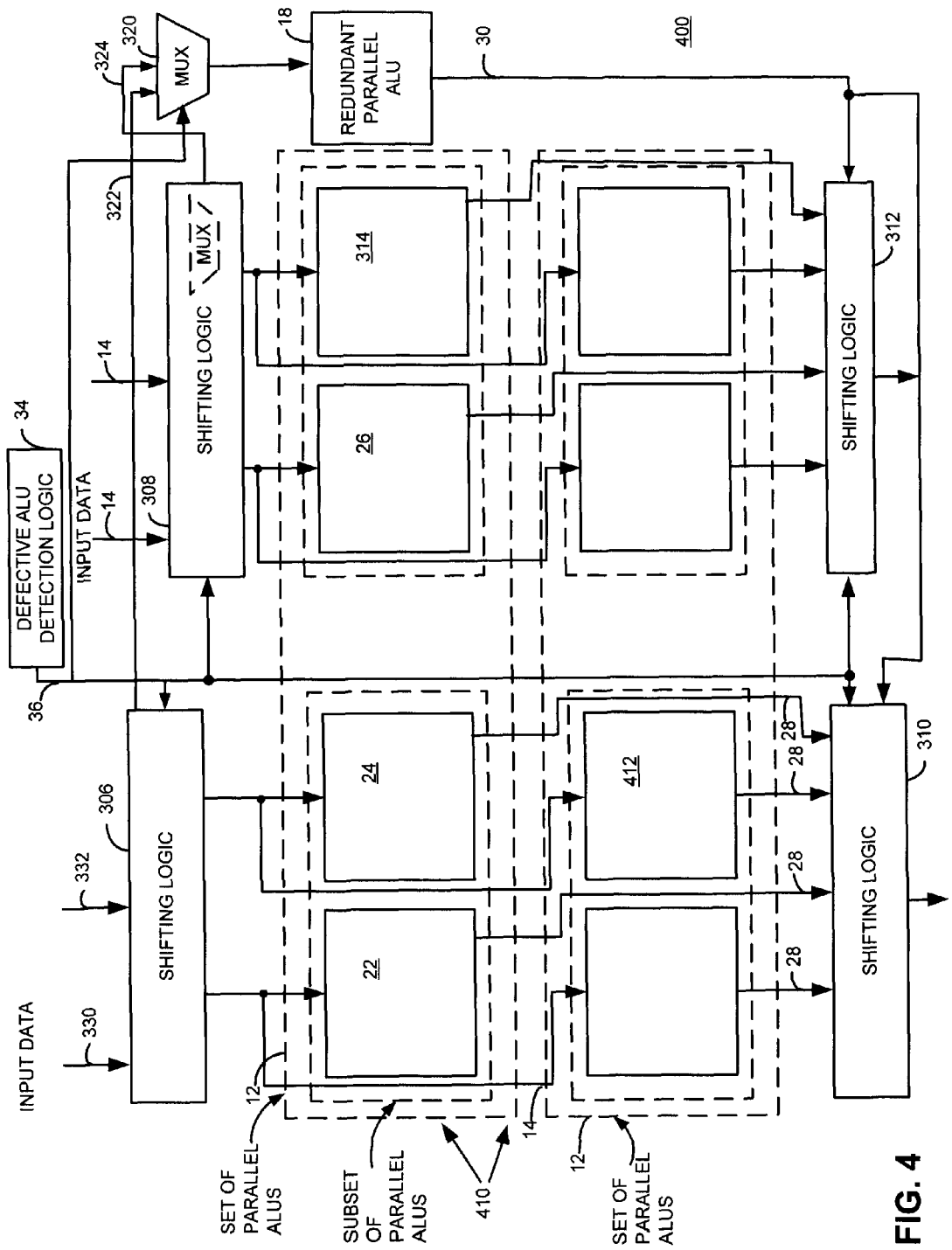
FIG. 4 is a block diagram illustrating another example of an apparatus with circuit redundancy in accordance with one embodiment of the invention.

FIG. 4 illustrates yet another embodiment of an apparatus 400 that operates in a similar manner as described with respect to FIG. 3 except that in this embodiment, the set of parallel ALUs is a two dimensional array of ALUs, shown as a subset of parallel ALUs 410. Each set of ALUs is shown to be logically arranged in a horizontal parallel configuration. Each of the set of horizontal parallel ALUs can receive the input data in a common cycle. By way of example, and not limitation, each of the horizontal sets may be a SIMD processor that includes four parallel ALUs. However it will be recognized that any suitable logic may be employed. In this example, the defective ALU detection logic 34 may contain or access registers that indicate, for example, the X and Y coordinate (i.e. row and column position) of the ALU that is defective. For example, since there are eight ALUs shown in this example, the ALU 412 may be defective. In this case, the input data 14 destined for ALU 412 is shifted and in this instance since it is an end parallel ALU the data destined for 412 would be shifted by shifting logic to the multiplexor 320 and then passed by the multiplexor 320 to the redundant parallel ALU 18 as previously described. As such the structure described herein is applicable to two dimensional arrays of ALUs or any other suitable logic.

Figure 5:
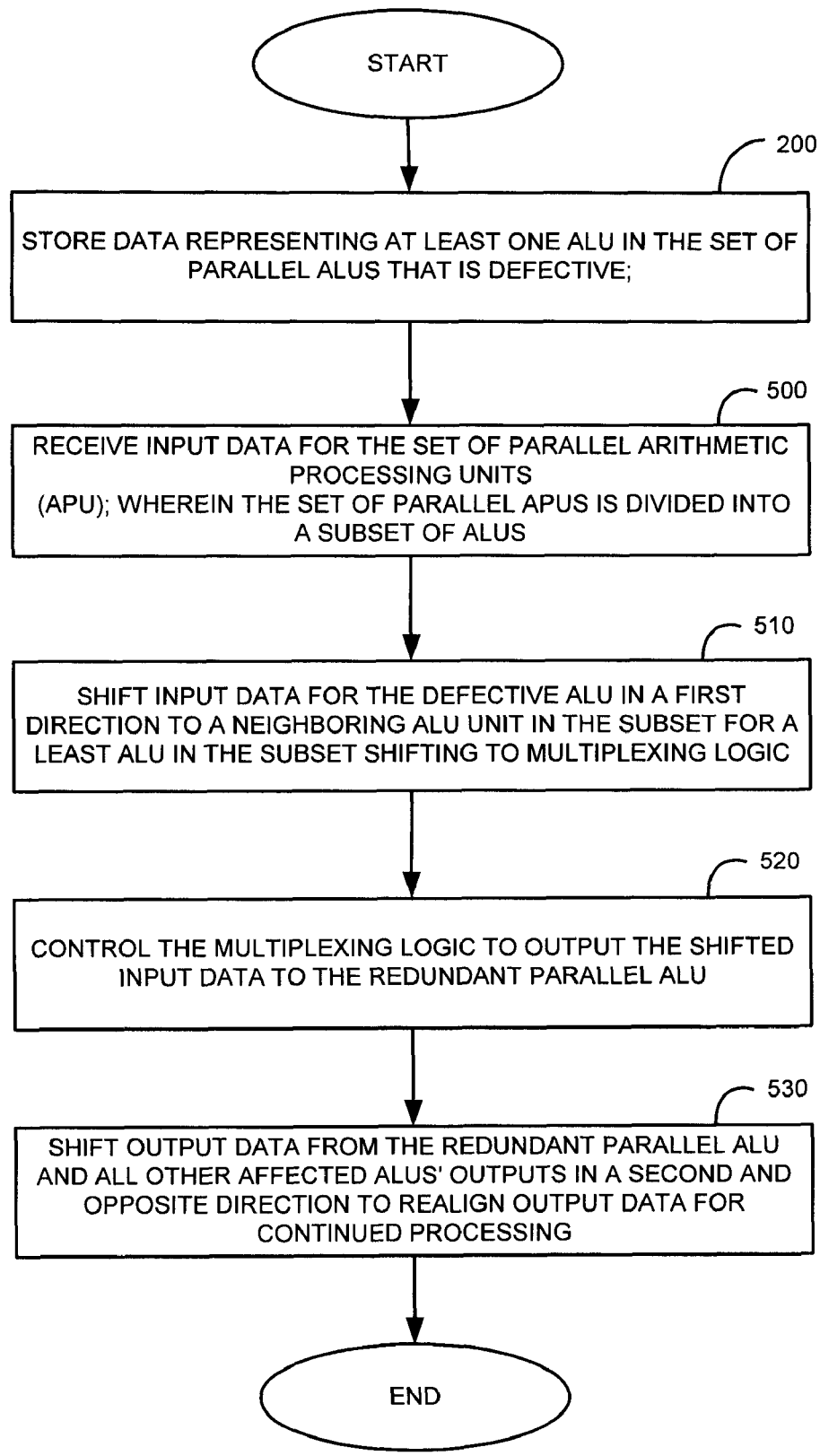
FIG. 5 is a flowchart illustrating one example of a method for providing circuit redundancy in accordance with one embodiment of the invention.

FIG. 5 illustrates a method for providing circuit redundancy as carried out for example by a circuit of FIG. 4 or any other suitable structure. As shown in block 200 the method includes storing data representing at least one ALU in the set of parallel ALUs that is defective such as in a register or any other suitable memory element. Based on this data, the defective ALU detection logic 34 then takes the appropriate action to control the requisite shifting logic (and associated multiplexor circuitry if applicable) to cause shifting of input data to a neighboring ALU in a subset and the redundant parallel ALU 18. For example as shown in block 500, the method includes receiving input data for the set of parallel arithmetic processing units 12 wherein the set of parallel ALUs may be divided into a subset of ALUs, possibly forming a two dimensional array of ALUs. As shown in block 510 the method includes shifting input data for the defective ALU in a first direction, such as to the right, to a neighboring ALU unit in the subset. The method may also include then shifting data normally destined for an end ALU in the subset to the multiplexing logic 320. As shown in block 520, the method includes controlling the multiplexing logic 320 to output the shifted input data to the redundant parallel ALU 18. As shown in block 530 the method includes shifting output data by the shifting logic 310 and 312 for example, from the redundant parallel ALU 18 in an opposite direction to realign output data for continued processing. Again as noted with respect to FIG. 3, limiting the shifting to subsets of parallel devices can reduce the amount of wiring and limit the groups of ALUs affected by the defective ALU. In addition more delay stages may not need to be added since shifting is not provided for all ALUs in this example. Other advantages would be recognized by those with ordinary skill in the art.

Figure 6:
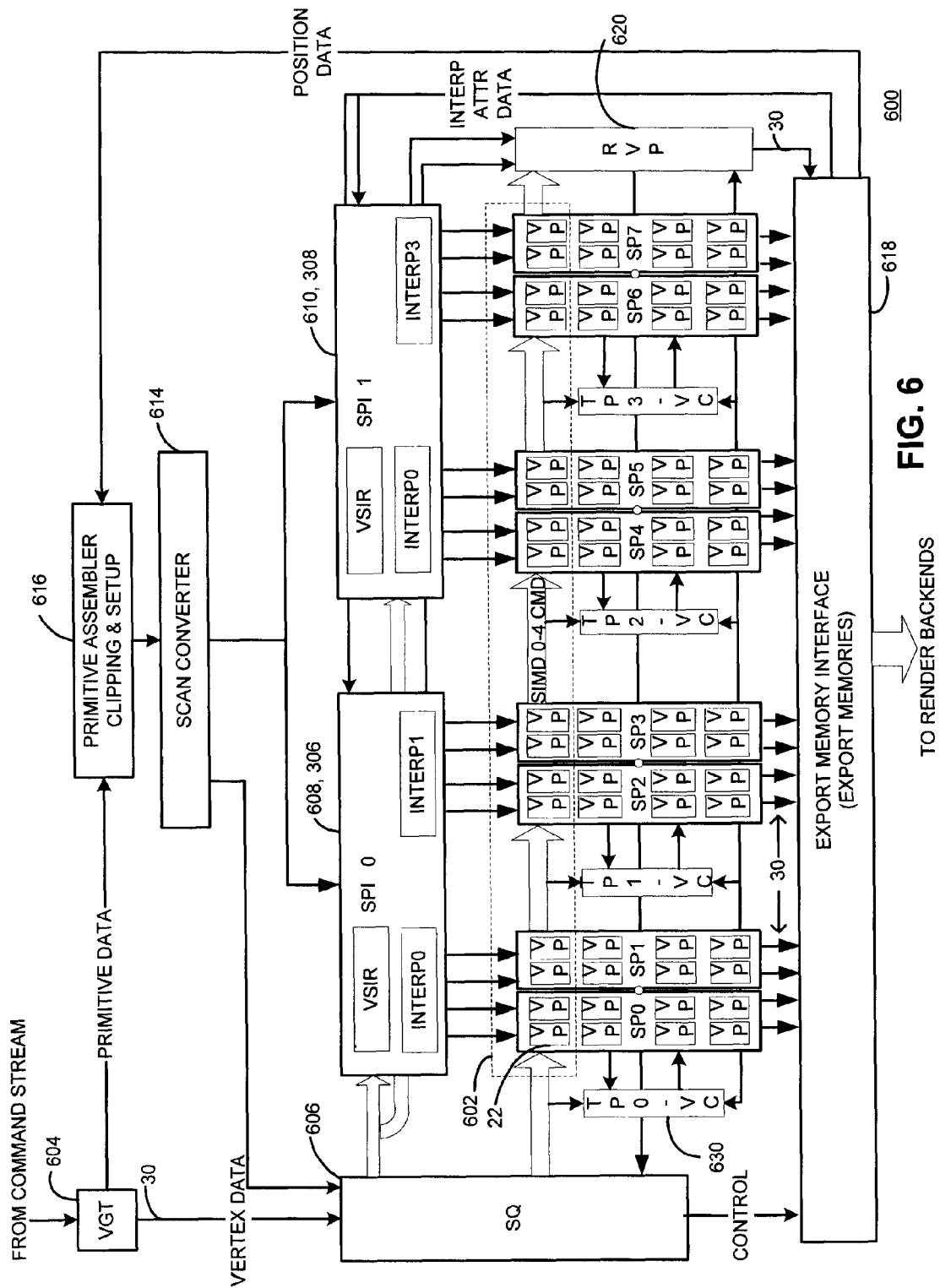
FIG. 6 is a block diagram illustrating one example of an apparatus with circuit redundancy in accordance with one embodiment of the invention.

FIG. 6 illustrates a block diagram of one example of an apparatus 600 such as a graphics processor employing the disclosed redundancy control and operation. It will be understood that this is an illustrative example only and is not intended to be limiting as the described operations and structure may be employed in any suitable apparatus. In the context of a graphics processor, as shown in this example, there are sixty-four ALUs shown which function as shader engines. Each ALU, also referred to as a vector scalar processor, contains a vector processor, that can perform dot product operation or other suitable vector operations as well as a scalar engine that may perform for example sine and cosine operations, square root operations, and other suitable scalar operations. For purposes of illustration, 64 shaders will be described. As shown, 64 of the shaders are organized in 4 sets of 16 wherein each set of 16 is one SIMD processor. As such all 16 engines within an SIMD or set of parallel processing ALUs, are executing the same instruction on different data types each clock cycle. The SIMD processors or sets of parallel ALUs, operate independently and each may be processing different data types (pixels, vertices, primitives, etc) and different groups of data types or even separate shaders if desired. Each SIMD processor shown as 602 may be given for example a vertex vector (group of vertices) or a pixels vector (group of pixel quads i.e. 4 pixels) to process for a single instruction. For example, in this embodiment, each SIMD 602 processes the same instructions across all 16 ALUs.

By way of example only, there are 4 GPRs (General Purpose Register file) per ALU. Each of the 4 GPRs belongs to one ALU and are preferably skewed in their reads (and writes) so for each clock there is a new source A, B and C available to a vector engine. For example, for a single vector/scalar/fetch engine input/output requirements, there can be up to 4 source operands required per clock and up to 4 desired writes per clock. However it will be recognized that any suitable ALU may be employed.

As shown, the apparatus 600 includes a vertex grouper tessellator 604, a sequencer 606, a shader pipe interpolator 608 and 610, shader processors 612, scan converter 614, a primitive assembler 616, export memories 618, and redundant logic 620 that includes the redundant parallel ALUs 18.

The vertex grouper tessellator 604 performs the following primary tasks: it fetches vertex indices from memory, performs vertex index reuse determination such as determining which vertices have already been processed and hence not need to be reprocessed, converts quad primitives and polygon primitives into triangle primitives, and computes tessellation factors for primitive tessellation. Such operations may be performed in any suitable manner including those known in the art.

The sequencer 606 receives the vertex vector data 630 from the VGT 604 and pixel vector data from the scan converter 614. The sequencer 606 is the primary controller for the shader pipe interpolators 608 and 610, the shader processors 612 and the shader export memories 618. The sequencer 606 manages vertex vector and pixel vector operations, vertex and pixel shader input data management, memory allocation for export resources, thread arbitration for multiple SIMDs and resource types, control flow and ALU execution for the shader processors, shader and constant addressing and any other desired control function.

The scan converter 614 performs the task of determining which pixels (and samples) are covered by a given primitive received from the primitive assembly unit 616. The scan converter 614 also performs the per pixel perspective correct barycentric coordinate computation, packing quads of pixels into 16 quads pixel vectors for pixel shading. As such the scan converter may provide control data to the sequencer 606 to define a pixel vector and barycentric coordinates to the shader interpolators 608 and 610 for attribute interpolation to the pixel for pixel shader input data creation.

The primitive assembler 616 receives primitive data as received from the command stream by the VGT and vertex position data from the export interface 618 and may perform clipping, viewpoint transform, and backface culling. The primitive assembly 616 provides surviving primitives to the scan converter 614 for rasterization to create pixels in the primitive to be pixel shaded.

The texture pipe and vertex cache 630 are also operatively coupled to the SIMD processors to service memory fetch request to return the requested data. The texture pipe performs the address calculations for 1d textures, 2d textures, cube maps and 3d volume map based on addresses from the shader pipes and state data from the sequencer to issue fetch requests to memory via an on chip cache to fetch corresponding data. The texture pipe and vertex cache 630 performs texture map decompression and filtering computations prior to staging return data to the shader pipes.

The vertex cache provides a second fetch resource for the SIMD engines. The vertex cache accepts vertex indices from the set of shader pipes that reside in the SIMD processors and state data from the sequencer to perform address calculations for data fetching. If the requested data is not in the cache it will be fetched from memory. The return data can undergo a format conversion prior to loading data back into the requesting SIMD processors. Any such graphic processor could employ one, two or more fetch resources.

The SIMD processor 602 which includes, in this example, a set of parallel ALUs that are divided into subsets in groups of four also are constructed to allow independent control of each of the subsets to facilitate 4, 8, 12 or 16 vector/scalar processor units per SIMD. This control is useful in determining cost and performance tradeoffs as well as allowing smaller functionally equivalent configurations for testing of future derivative products if desired. As noted, however, in this example, the redundant logic 620, is a redundant vector/scalar processing unit that serves as a 65th ALU which is available on the die to replace any one of the 64 ALUs.

As such the ALUs in the SIMD 602 in this example are a bank of floating point unit processors that execute in parallel and each vector scalar processor may be effectively switched out if any one of them are bad.

The shader processor interpolator (SPI) includes input staging storage and preprocessing logic to determine and load input data into the parallel ALU units. To create data per pixel, a bank of interpolators interpolate vertex data per primitive with the scan converter's provided barycentric coordinates to create data per pixel for pixel shaders in a manner as known in the art.

Figure 7:
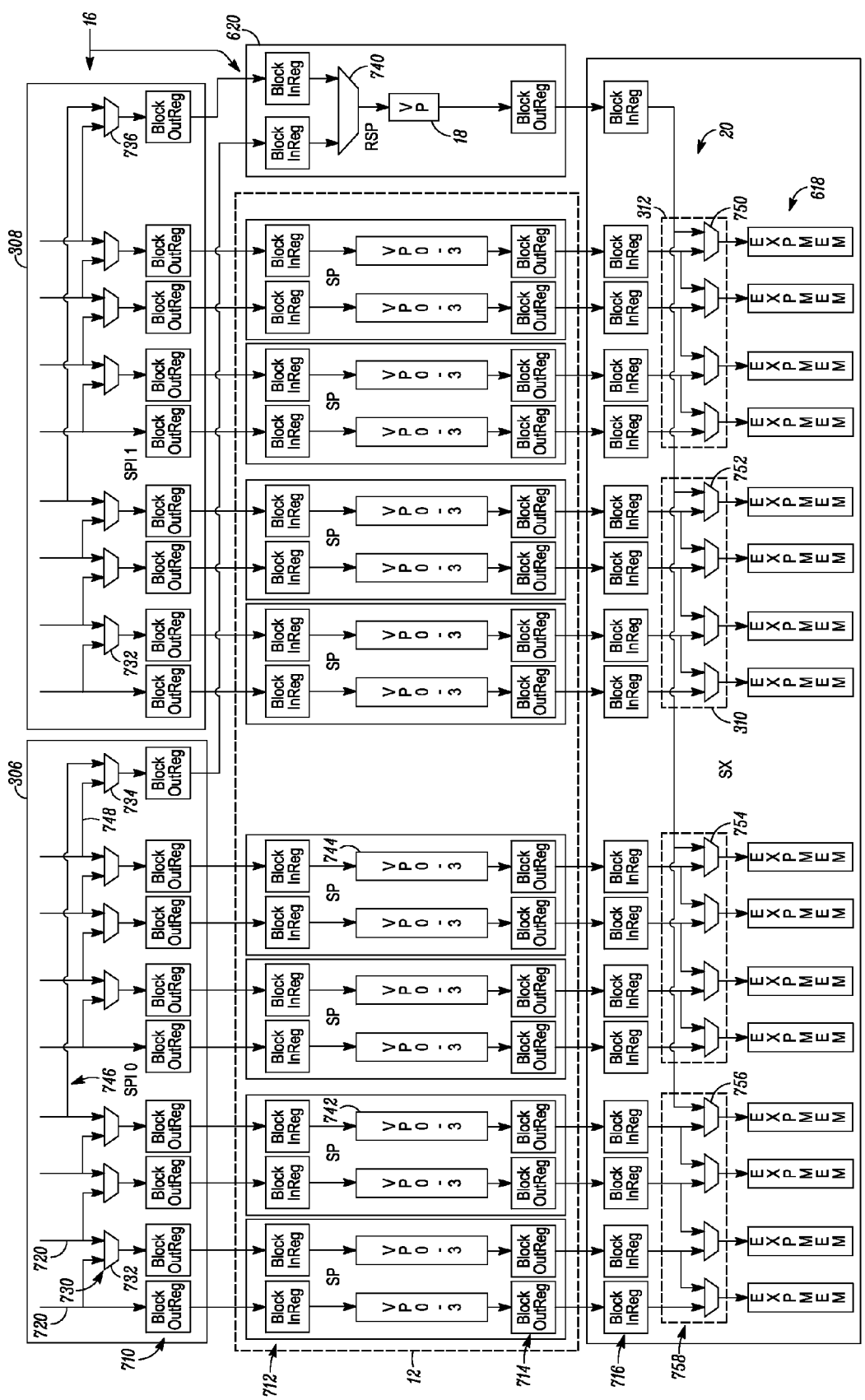
FIG. 7 is a block diagram illustrating one example of an apparatus with circuit redundancy in accordance with one embodiment of the invention.
Figure 8:
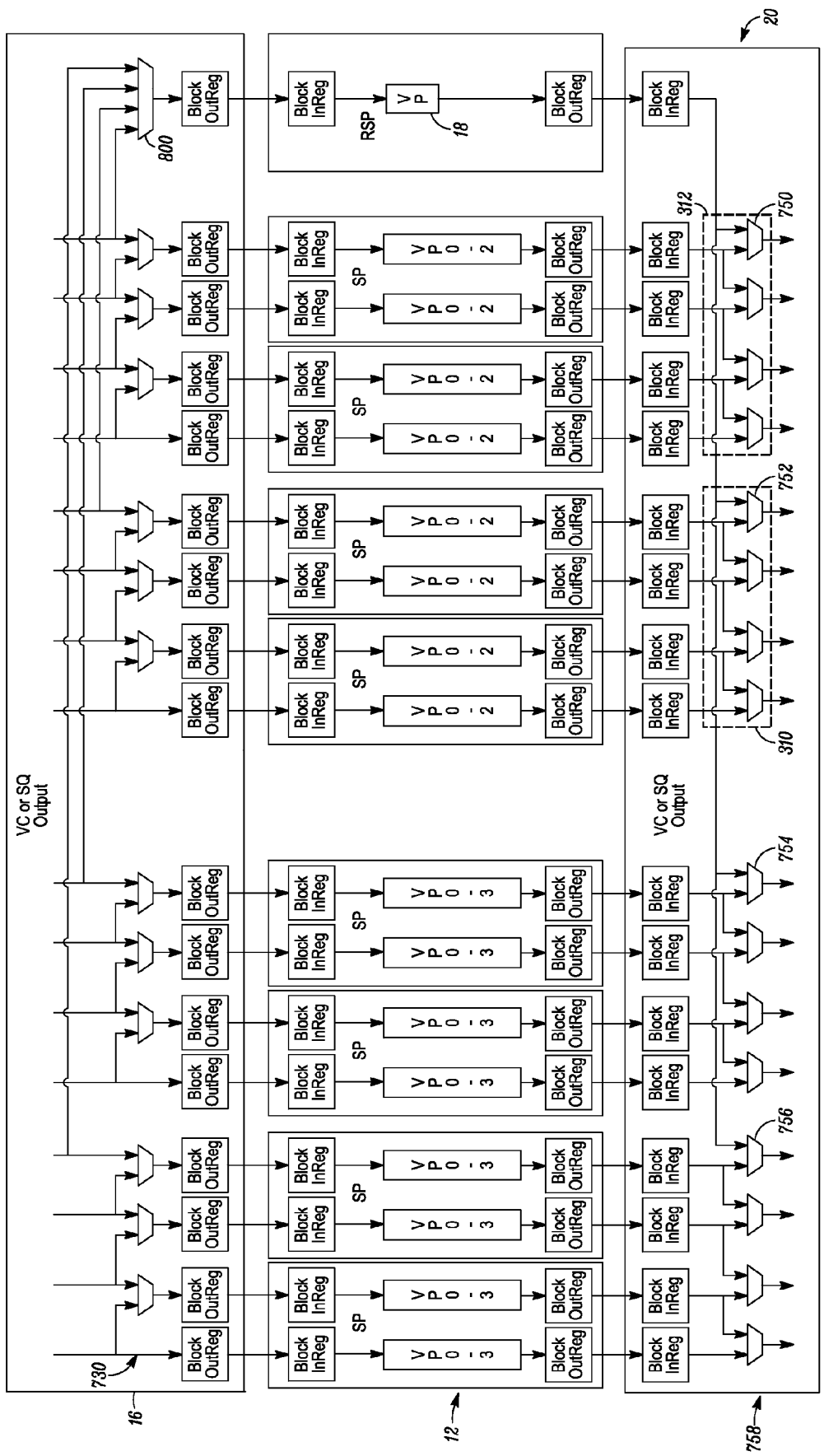
FIG. 8 is a block diagram illustrating one example of an apparatus with circuit redundancy in accordance with one embodiment of the invention.
Figure 9:
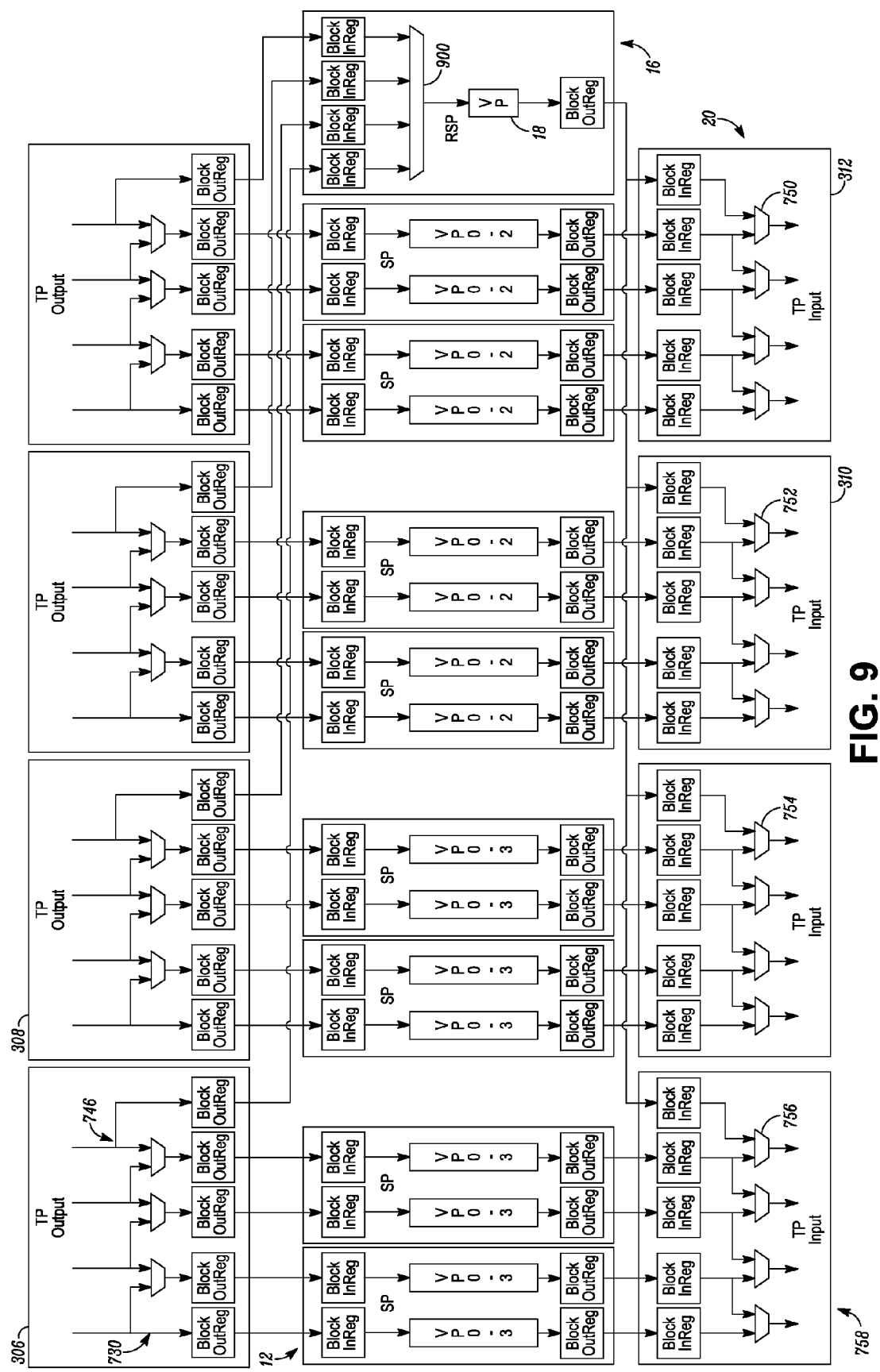
FIG. 9 is a block diagram illustrating one example of an apparatus with circuit redundancy in accordance with one embodiment of the invention.

Referring to FIGS. 7, 8, and 9, one embodiment of an apparatus with circuit redundancy is shown as applied to a single SIMD or a set of parallel ALUs. The shifting logic is different for each of the corresponding portions of the graphics processing functions to be performed although the operations are performed by the same set of parallel ALUs. For example, FIG. 7 illustrates an embodiment where the input data is coming from the SPI 608 and 610. FIG. 8 illustrates an embodiment where the input data is coming from the vertex cache or sequencer. FIG. 9 illustrates an embodiment where the input data is coming from the texture pipeline to the set of parallel ALUs. As shown, only one ALU serves as the redundant unit.

As shown, there are banks of data buffers 710, 712, 714 and 716 to suitably buffer data as it is being output or input by any suitable stage. Likewise the buffers are also included in the redundancy logic 620. As will be recognized, the redundancy logic 620 uses a common redundant parallel ALU 18 but with different multiplexing circuitry as needed as shown for example in FIG. 7 and FIG. 9. As shown in FIG. 8, the shifting logic circuitry (including multiplexing circuitry) are slightly different from that shown in FIGS. 7 and 9. As also shown in these diagrams each of the ALUs has an independent input data path generally shown as 720.

With respect to FIG. 7, the input data shifting logic 16, in this example, includes a bank of redundancy multiplexors 730 for each of a plurality (here shown as two) of input streams to a neighboring ALUs. These redundancy multiplexors are generally shown individually as 732. Each of these redundancy multiplexors are two-to-one multiplexors which can select between one of two neighboring input streams for output to a given parallel ALU. In addition, the redundancy multiplexors 730 include subset multiplexors 734 and 736 for each subset group. For example, in this embodiment, 4 ALUs define a group or subset and 2 subsets are grouped through subset multiplexor 734 and 736. The output of the subset multiplexor 734 and 736 are coupled to provide input to a redundancy selection multiplexor 740 whose output provides the input to the redundant parallel ALU 18. As is also shown, an end ALU in a subset, such as ALU 742 and 744 have their input streams 746 and 748 coupled to subset multiplexor 734 and the multiplexor 732. As such, the end ALU input data is shifted to the redundant parallel ALU 18, if for example, one of the ALUs within the subset is defective.

Also, although not shown, the defective ALU detection logic 34 is operatively coupled to provide control data (e.g. signals) to each of the multiplexors in the shifting logic. In this example the redundancy selection multiplexor 740 is included as part of the shifting logic 16.

In the output data shifting logic 20, each of the end multiplexors 750, 752, 754 and 756 are coupled to the output of the redundancy ALU to realign data normally output by the end ALU. In addition a similar bank of multiplexors 758 is illustrated in the output shifting logic wherein each of the multiplexors 758 is coupled to an output of two neighboring ALUs in the set of ALUs and that receive control data from the defective ALU detection logic 34 to suitably control the shifting of output data if the redundant parallel ALU 18 is used.

FIG. 8 shows another embodiment wherein a 4 to 1 redundancy multiplexor 800 is used that is operatively coupled to receive input data for an end ALU in a subset for all of the end ALUs in the set of parallel ALUs. In addition the redundancy multiplexor 740 shown in FIG. 7 has its functionality carried out for example by the redundancy multiplexor 800.

FIG. 9 is another embodiment showing that the subset multiplexor 800 or subset multiplexors 734 and 736 may be implemented for example as multiplexor 900 again depending upon the requirement of the stage providing the input data to the set of parallel ALUs. For example, additional delay may be required or buffering may be required depending upon any particular implementation. For example, a 4-to-1 multiplexor is used whose input is operatively coupled to receive input data for an end ALU in each of a plurality of subsets of ALUs. Similarly, the output data shifting logic also includes a multiplexor that receives the output of the redundant ALU. As shown in FIG. 9 each quad of ALUs may be in a different physical block on a chip and as such the shifting logic on both the input path and the output path are provided as shown.

For example, with respect to FIG. 7, it can be assumed that each SPI block has eight 128 bit input data busses for respective SPs for a total of 16×128 bit bus connections wherein each 128 bit bus is used to load either vertex or pixel input vector data into a respective set of GPRs within the ALUs. The redundant bus should contain the last pixel and vertex data item for a quad subset that contains the bad ALU.

In a similar fashion the shader processor (SP) and shader export (SX) blocks shown for example in FIG. 7 may have 16×128 bit data busses that carry position, color or parameter cache write attribute data. The redundant ALU outputs on one 128 bit buss that connects to the SX. The SX block multiplexes the redundant output data with the parallel ALU output data pipes to realign the output data in the group containing the defective ALU to realign the output for further processing.

As shown, two sets of two-to-one multiplexors are used with respect to the SPI input to facilitate suitable synchronization and timing. As shown in FIG. 8, a single 4-to-1 multiplexor 800 is used for the sequencer or vertex cache whereas as shown in FIG. 9, a 4-to-1 multiplexor 900 is used after the register bank. As previously noted, the various block-in registers and block-out registers may be needed to physically route data because of delays in routing on a chip and some may be eliminated or additional ones may be added if desired.

As also shown in FIG. 11 (fuse and register tables) the rom_bad_pipe_fuse register shows the register bits for controlling the shifting by indicating which ALU is defective. For example, the register bits 1002 selects which vertical slice of pipe has the defect in it and register bits 1006 select the SIMD that is defective thereby indicating for example a row and column designation of the defective ALU where a two dimensional array is employed. Register bits 1004 are set to indicate whether to enable a redundant SP usage in the event a redundant ALU is necessary.

The corresponding ROM_BAD_PIPE_DISABLE REGISTER 1100 provides a runtime control of the redundant unit so if no fuses are blown the redundancy use is under program control by logically OR'ing the enables and muxing the pipe and SIMD selects with the fuse bits.

Figure 10:
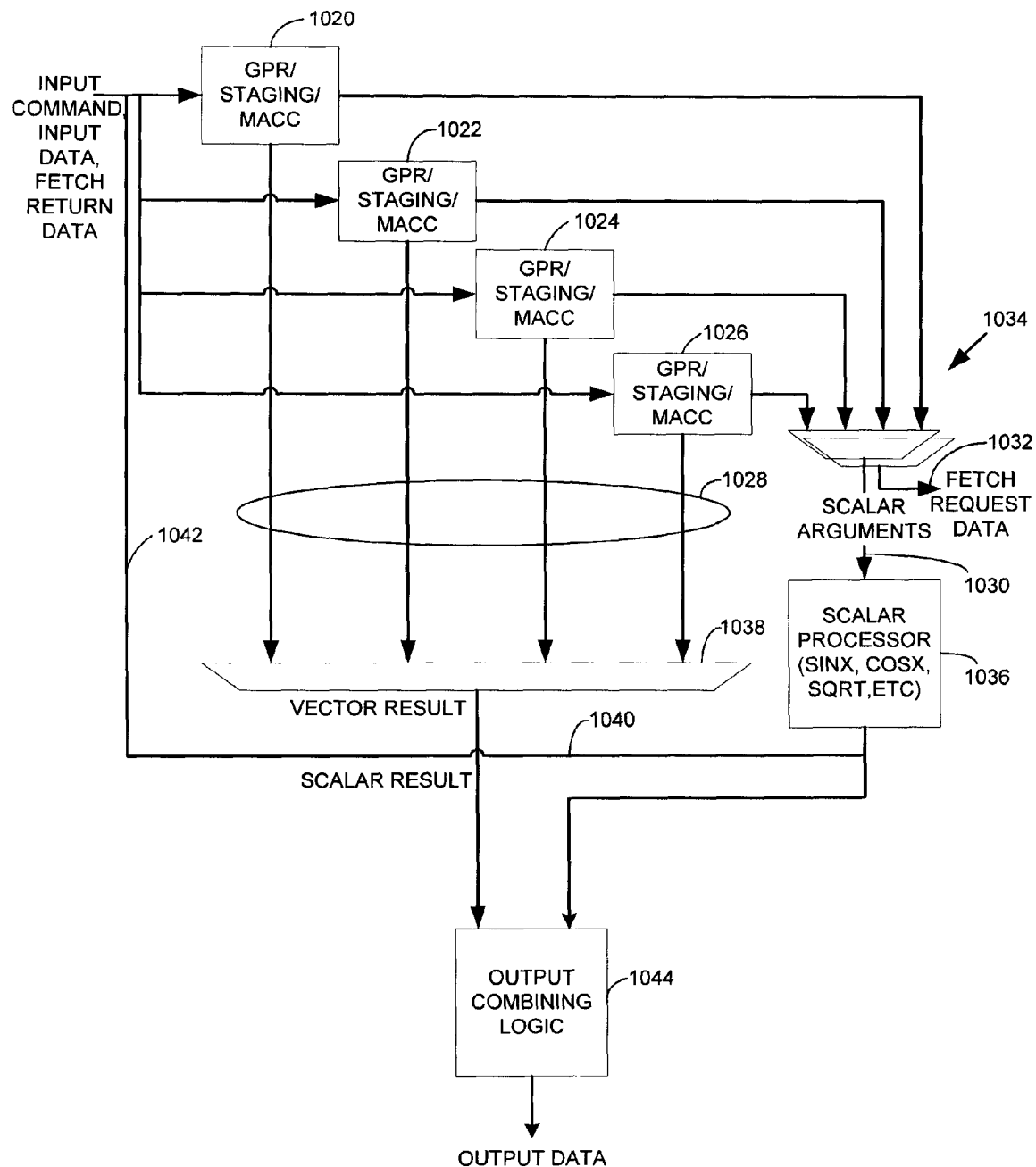
FIG. 10 is a block diagram illustrating one example of an ALU, such as a vector scalar processor.

FIG. 10 illustrates in a functional block diagram form, one example of an ALU such as a vector scalar processor (VP) shown for example in FIG. 6. The ALU includes 4 modules that contain a GPR (general purpose register file), staging logic and a MACC (multiply and accumulate processor). As shown, 4 elements may be processed at one time. The modules are shown as 1020, 1022, 1024 and 1026 and they output vector results 1028, scalar arguments 1030 and fetch addresses 1032. As shown, the vector results 1028 are time multiplexed using mux logic 1038 and combined 1042 with scalar results 1040 to write back to the GPRs and create output data by output combining logic 1044. The scalar arguments and fetch address are time multiplexed, via mux logic 1034 to provide data to the scalar engine 1036 and the fetch resources. However it will be recognized that any suitable ALU may be employed.

In one embodiment, fuse bits (1002-1006 of FIG. 11) are used by the defective ALU detector control logic to select and set the multiplexors to suitably shift the data to neighboring ALUs and then to the redundant ALU. Fuse bits 1007 are used to designate which ALUs are defective but need not be used by the defective ALU detector control logic. Instead, these fuse bits may be used to identify defective ALUs after initial testing of the integrated circuit so that they are not used during normal operation.

In an alternative embodiment, the fuse bits are not used but instead dynamic selection and control of the shifting multiplexors may be performed wherein, for example, the input data 14 may include an indication of which ALU is to receive the data and a comparison is then made by the defective ALU detection logic by evaluating a register that contains data representing which ALU is defective. If the information is destined for the defective ALU, the defective ALU detection logic 34 then suitably switches and controls the shifting logic and associated multiplexors to facilitate the shifting and activation of the redundant parallel ALU 18 as needed. This may be carried out on a dynamic basis for each data set being loaded into the set of parallel ALUs, if desired.

As noted above, in one embodiment the data is shifted to a neighboring ALU but not to all ALUs in the set since subsets are designated to limit the amount of shifting and hence reduce the number of wired connections necessary to route the information to a suitable redundant ALU. Moreover due to physical locations of the next neighboring ALU on a chip, shifting to all neighboring ALUs may add too much delay. Accordingly the grouping of ALUs and subsets is utilized, in one embodiment. In other words, a set of ALUs is partitioned into input groups associated with a subset of ALUs. In addition as noted above, the shifting logic may shift the data to multiplexing logic or switching logic which then suitably routes the shifted input data to the parallel redundant ALU.

The above detailed description of the invention and the examples described therein have been presented for the purposes of illustration and description only and not by limitation. Also, the word "coupled" means directly or indirectly coupled to facilitate operation of the circuit. It is therefore contemplated that the present invention cover any and all modifications, variations or equivalents that fall within the spirit and scope of the basic underlying principles disclosed above and claimed herein.

What is claimed is:

1. An apparatus with circuit redundancy comprising:
a first subset of parallel arithmetic logic units;
a second subset of parallel arithmetic logic units;
a redundant ALU in parallel with said first and second subsets of parallel ALUs; and
input data shifting logic, operatively coupled to the first and second subsets of parallel arithmetic logic units comprising multiplexing logic that is operatively coupled to receive input data for an end ALU in each of the first and second subsets of parallel ALUs and wherein the multiplexing logic is operatively coupled to the redundant parallel ALU and is operative to provide selected input data from either of an end ALU from said first subset of ALUs or an end ALU from the second subset of ALUs, such that the data shifting logic, in response to a defect, is operative to shift input data, using the multiplexing logic, among a plurality of subsets of parallel ALUs to provide input data to the redundant ALU.

2. The apparatus of claim 1 comprising data shifting logic that is operative to shift, in an opposite direction, output data for each of a shifted subset of parallel ALUs.

3. The apparatus of claim 2 comprising defective ALU detection logic operative to control the multiplexing logic to provide input data from either of the subsets of ALUs to the redundant parallel ALU and to control data shifting logic to provide the output data from the redundant parallel ALU to be shifted in an opposite direction to realign output data for continued processing.

4. The apparatus of claim 1 comprising a plurality of sets of parallel ALUs wherein at least one of the sets of parallel ALUs is comprised of the first and second subset of parallel ALUs.

5. A graphics processing circuit comprising:
a set of parallel vector scalar processing units;
a redundant parallel vector scalar processor;
wherein the set of parallel vector scalar processing units comprises a first subset of parallel vector scalar processing units and a second subset of parallel vector scalar processing units; and
input data shifting logic, operatively coupled to the first and second subsets of parallel arithmetic logic units comprising multiplexing logic that is operatively coupled to receive input data for an end vector scalar processing unit in each of the first and second subsets of parallel vector scalar processing units and wherein the multiplexing logic is operatively coupled to the redundant parallel vector scalar processing unit and is operative to provide selected input data from either of an end vector scalar processing unit from said first subset of vector scalar processing units or an end vector scalar processing unit from the second subset of vector scalar processing units, such that the data shifting logic, in response to a defect, is operative to shift input data, using the multiplexing logic, among the plurality of subsets of parallel vector scalar processing units to provide input data to the redundant vector scalar processing unit.

6. The graphics processor of claim 5 wherein the set of parallel vector scalar processing units are single instruction multiple data (SIMD) processors.

7. A method for providing circuit redundancy comprising:
storing data representing at least one arithmetic logic unit (ALU) in a set of parallel ALUs that is defective;
receiving input data for the set of parallel ALUs wherein the set of parallel ALUs is divided into a plurality of subsets of ALUs;
selecting output of shifted input data from each of the plurality of subsets of ALUs to a redundant parallel ALU; and
shifting output data from the redundant parallel ALU and all other affected ALUs outputs in a second and opposite direction to realign output data for continued processing.

* * * * *